(12) United States Patent
Yen

(10) Patent No.: US 10,033,166 B2
(45) Date of Patent: Jul. 24, 2018

(54) STRIPPING PLIER WITH SUPPORTING STRUCTURE

(71) Applicant: Chao-Chin Yen, New Taipei (TW)

(72) Inventor: Chao-Chin Yen, New Taipei (TW)

( * ) Notice: Subject to any disclaimer, the term of this patent is extended or adjusted under 35 U.S.C. 154(b) by 339 days.

(21) Appl. No.: 14/753,684

(22) Filed: Jun. 29, 2015

(65) Prior Publication Data

US 2016/0380416 A1 Dec. 29, 2016

(51) Int. Cl.
*H02G 1/12* (2006.01)

(52) U.S. Cl.
CPC .................... *H02G 1/1212* (2013.01)

(58) Field of Classification Search
CPC ..................................................... H02G 1/1212
USPC ........................................................ 81/9.42
See application file for complete search history.

(56) References Cited

U.S. PATENT DOCUMENTS

| | | | | |
|---|---|---|---|---|
| 3,128,652 A | * | 4/1964 | Schinske | H02G 1/1212 81/9.42 |
| 4,703,674 A | * | 11/1987 | Chen | B25B 7/02 81/9.42 |
| 4,862,580 A | * | 9/1989 | Wang | B25B 27/146 29/270 |
| 7,096,760 B2 | * | 8/2006 | Schmode | H02G 1/1212 81/9.4 |
| D759,452 S | * | 6/2016 | Persson | D8/52 |
| D771,458 S | * | 11/2016 | Yen | D8/52 |
| 2014/0020513 A1 | * | 1/2014 | Yen | H02G 1/1273 81/9.41 |

* cited by examiner

*Primary Examiner* — Joseph J Hail
*Assistant Examiner* — J Stephen Taylor
(74) *Attorney, Agent, or Firm* — Chun-Ming Shih; HDLS IPR Services

(57) ABSTRACT

A stripping plier includes a first plier handle, a second plier handle, a blade assembly, a spring and a supportive blocking member. The blade assembly is attached to two opposite side edges of the first plier handle and the second plier handle correspondingly; two ends of the spring are secured onto the first plier handle and the second plier handle respectively; the supportive blocking member is arranged on one side edge of the blade assembly, one end of the supportive blocking member is attached onto the first plier handle and another end thereof extends to the second plier handle. The supportive blocking member is able to provide supporting force during the cutting of the blade assembly in order to prevent any positional shifts of the stripping plier from occurring.

9 Claims, 6 Drawing Sheets

STRIPPING PLIER WITH SUPPORTING STRUCTURE

BACKGROUND OF THE INVENTION

Field of the Invention

The present invention is related to hand tool, in particular, to a stripping plier structure.

Description of Related Art

For conventional electrical and communication repairs as well as installations and layouts of hydroelectric wiring works, stripping pliers are one of the common hand tools often required and used. The main purpose of a stripping plier is to remove the outer insulative layer of coaxial cables, flat cables or conventional electrical wires in order to allow the conductive wire main body inside the electrical wire to expose such that proper electrical connections thereof can be facilitated.

During the use of a conventional stripping plier, one of the most upsetting situations has to do with the overly great torque applied while holding the plier such that the cutting blade of the stripping plier is caused to shift left or right and improper cutting of the electrical wire often results. In addition, such improper cutting can lead to poor cutting edge of the cable, which often requires another cutting again and the work efficiency is affected. Furthermore, multiple cutting can lead to the shortening of the length of the electrical wires and can be wasteful; especially, in situation where the length of the electrical wire is limited, improper use (applying an overly great force) of the stripping plier can be worse in hindering the connection of the electrical wires, which leads to a great inconvenience to the user using the plier.

In view of the above, the inventor seeks to overcome the problems associated with the currently existing technique after years of research and development along with the utilization of theoretical principles, and it is an objective of the inventor to provide a reasonable design and an improvement capable of effectively solve the aforementioned problems.

SUMMARY OF THE INVENTION

An objective of the present invention is to provide a striping plier with a supporting structure in order to prevent any positional shifts of the first plier handle and the second plier handle subject to external forces and to allow the blade assembly to perform cutting properly and smoothly.

To achieve the aforementioned objective, the present invention provides a stripping plier with a supporting structure comprising a first plier member, a second plier member, a blade assembly, a first spring and a supportive blocking member. The first plier member comprises a first plier handle and a first plier base attached to one side surface of the first plier handle; the second plier member comprises a second plier handle and a second plier base corresponding to the first plier base and attached to one side surface of the second plier handle, the second plier handle and the first plier pivotally attached to each other via a pivotal axle; the blade assembly is attached to two opposite side edges of the first plier handle and the second plier handle correspondingly; the first spring includes two ends respectively secured onto the first plier handle and the second plier handle, the first plier handle and the second plier handle use a recovery force of the first spring to open and close relatively to each other in order to allow the blade assembly to perform cutting; the supportive blocking member is arranged on one side edge of the blade assembly, one end of the supportive blocking member is attached to the first plier handle and another end thereof extends to the second plier handle, the supportive blocking member is configured to provide a supporting force to the first plier handle and the second plier handle during the blade assembly performs cutting.

In comparison to the prior arts, the stripping plier of the present invention provides a supportive blocking member arranged on one side of the blade assembly, one end of the supportive blocking member is attached to the first plier handle and another end thereof extends to the second plier handle such that during the cutting of the blade assembly, supporting force can be provided to the first plier handle and the second plier handle in order to prevent the unfavorable situation where positional shifts of the first plier handle and the second plier handle occur due to the compression exerted by the external force thereon. In addition, during the closing of the blade assembly, the supportive blocking member is able to provide a greater supporting force to the second plier handle in order to prevent any misplacement of the blade assembly, causing the plier to fail to perform cutting properly. Therefore, the present invention provides convenient and practical applications of the use of the stripping plier.

DETAILED DESCRIPTION OF THE INVENTION

Figure 1:
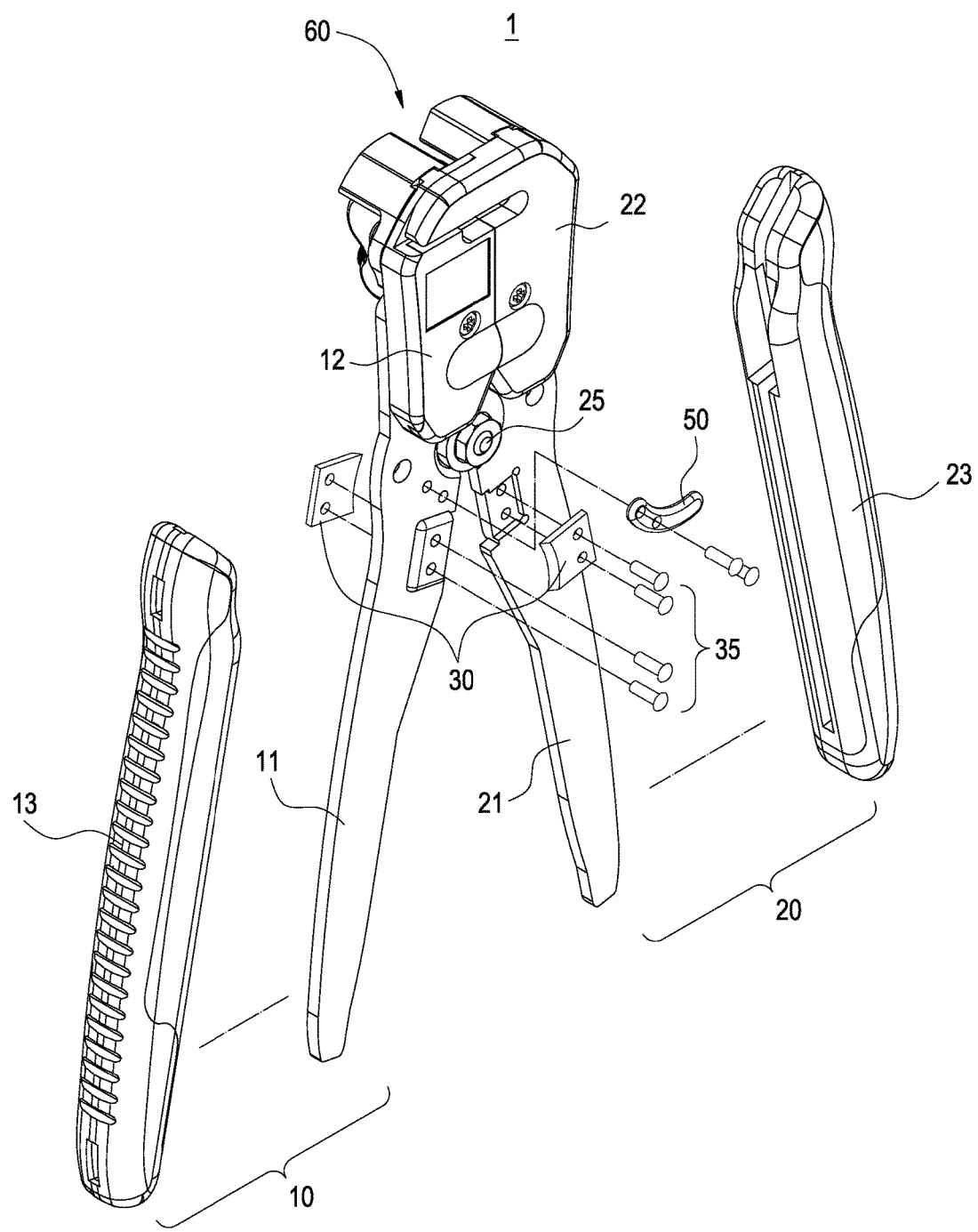
FIG. 1 is a perspective exploded view of a stripping plier of the present invention.
Figure 2:
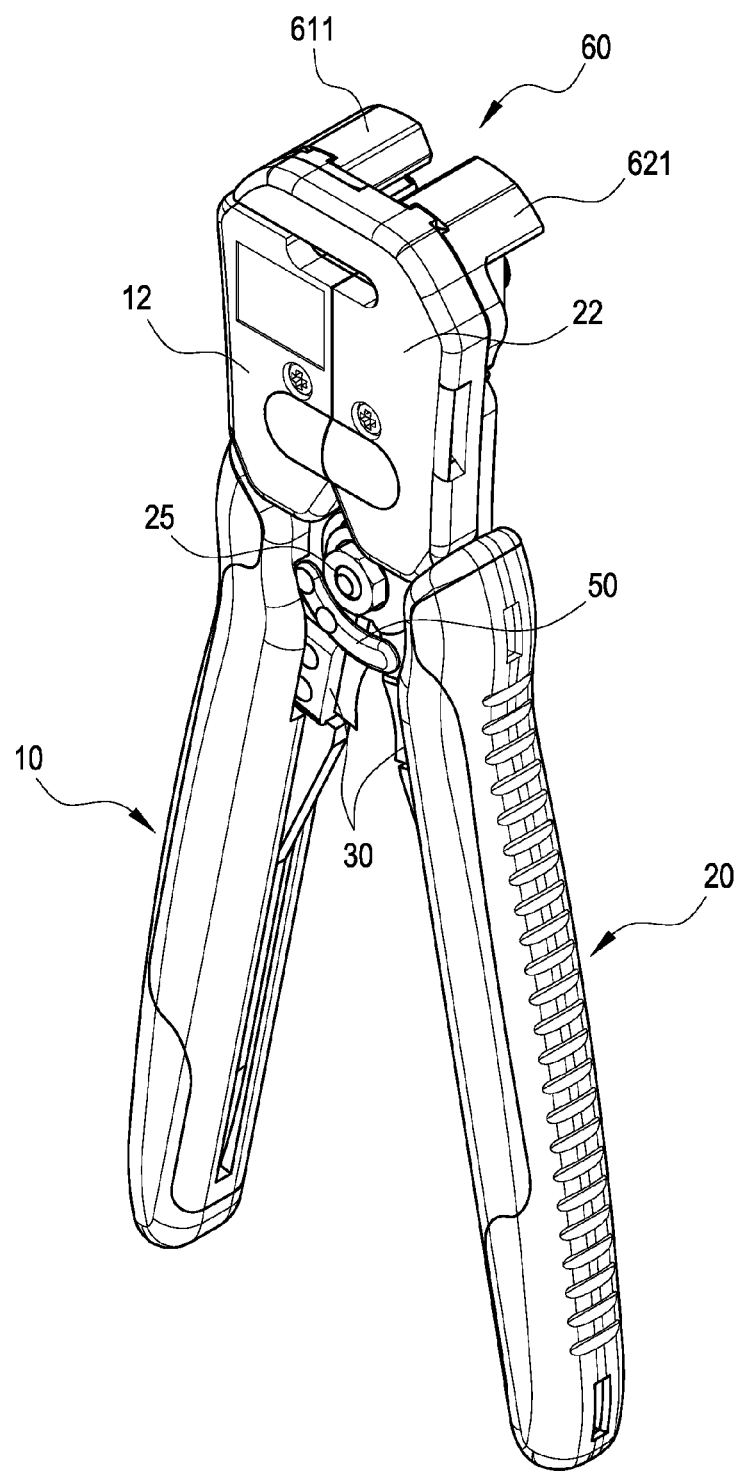
FIG. 2 is a perspective outer appearance view of the striping plier of the present invention viewed in a direction from one side thereof.
Figure 3:
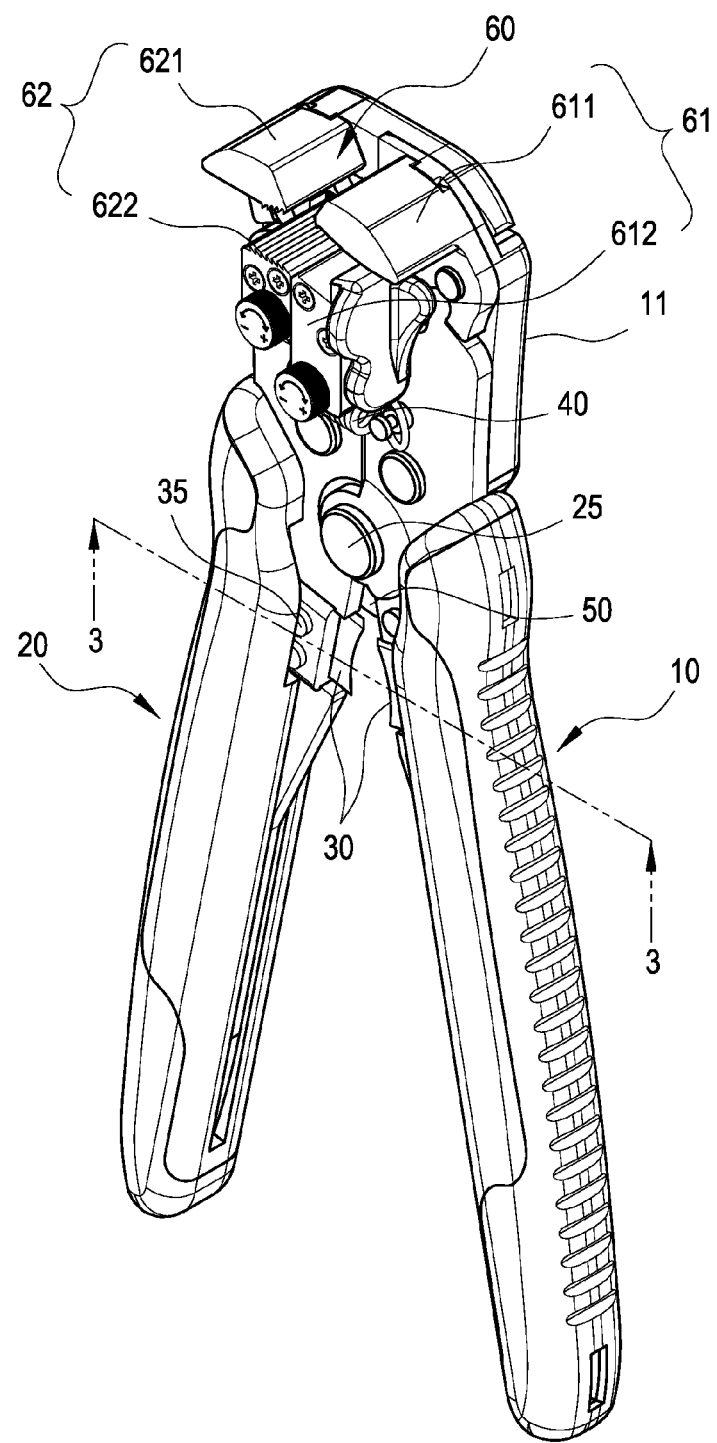
FIG. 3 is a perspective outer appearance view of the striping plier of the present invention viewed in a direction from another side thereof.
Figure 4:
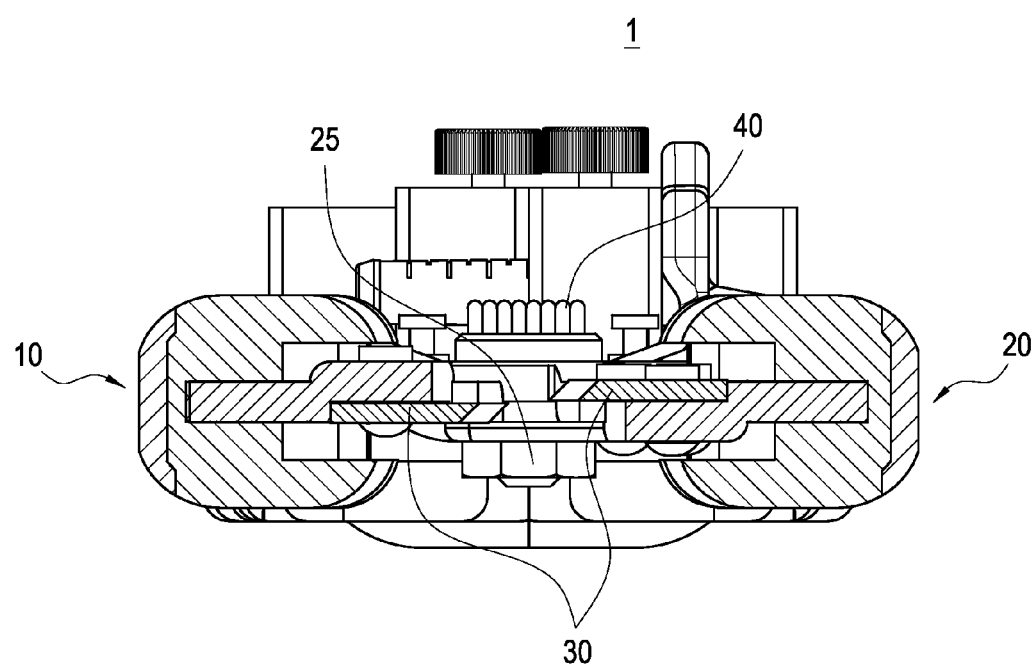
FIG. 4 is a cross sectional view of an assembly of the stripping plier of the present invention.

The following provides a detailed description on the technical content of the present invention along with the accompanied drawings; however, the accompanied drawings are provide for reference and illustration purposes only, which shall not be treated as limitations of the present invention.

Please refer to FIG. 1 to FIG. 4, showing a perspective exploded view, perspective outer appearance views viewed from two sides and an assembly cross sectional view of a stripping plier 1 with a supporting structure of the present invention. The stripping plier 1 with a supporting structure of the present invention comprises a first plier member 10, a second plier member 20, a blade assembly 30, a first spring 40 and a supportive blocking member 50; wherein, the first plier member 10 and the second plier member 20 are pivotally attached to each other as one integral body; the blade assembly 30, the first spring 40 and the supportive blocking member 50 are arranged between the first plier member 10 and the second plier member 20.

The first plier member 10 comprises a first plier handle 11 and a first plier base 12 attached to one side surface of the first plier handle 11. In addition, the second plier member 20 comprises a second plier handle 21 and a second plier base 22 corresponding to the first plier base 12 and attached to one side surface of the second plier handle 21. The second plier handle 21 and the first plier handle 11 are pivotally attached to each other via a pivotal axle 25.

In one embodiment of the present invention, the first plier member 10 further comprises a first plier sleeve 13, and the second plier member 20 further comprises a second plier sleeve 23. The first plier sleeve 13 is mounted onto an external of the first plier handle 11, and the second plier sleeve 23 is mounted onto an external of the second plier handle 21. The first plier sleeve 13 and the second plier sleeve 23 can provide a greater holding force.

The blade assembly 30 is correspondingly attached to two opposite side edges of the first plier handle 11 and the second plier handle 21. Furthermore, in this embodiment, the blade assembly 30 and the pivotal axel 25 are adjacent to portions of the first plier handle 11 and the second plier handle 21 (first plier sleeve 13 and the second plier sleeve 23) held by the user. Preferably, the stripping plier 1 further comprises a plurality of riveting elements 35, and the blade assembly 30 uses the plurality of riveting elements 35 to be attached onto the first plier handle 11 and the second plier handle 21.

In addition, two ends of the first spring 40 are secured onto the first plier handle 11 and the second plier handle 21 respectively. The first plier handle 11 and the second plier handle 21 uses a recovery force of the first spring 40 to open and close relatively in order to allow the blade assembly 30 to perform cutting.

Furthermore, the supportive blocking member 50 is an arched member; preferably, it is a metal plate. The supportive blocking member 50 is arranged on one side edge of the blade assembly 30, and one end of the supportive blocking member 50 is attached to the first plier handle 11 and another end thereof extends to the second plier handle 21; preferably, the supportive blocking member 50 is disposed between the pivotal axle 25 and the blade assembly 30. Moreover, the supportive blocking member 50 and the first spring 40 are relatively disposed on different sides of the first plier handle 11 and the second plier handle 21. For an actual practice, the supportive blocking member 50 includes a ½ portion thereof attached onto one side surface of the first plier handle 11; however, the present invention is not limited to such configuration only.

In addition, the arrangement of supportive blocking member 50 is primarily to provide supporting forces to the first plier handle 11 and the second plier handle 21 during the cutting of the blade assembly 30 in order to prevent the positional shifts of the first plier handle 11 and the second plier handle 21 due to the compression force exerted by an external force thereon.

The stripping plier 1 further comprises a wire stripping structure 60. In this embodiment, the wire stripping structure 60 is arranged on one end of the first plier base 12 and the second plier base 22. The wire stripping structure 60 comprises a blade base assembly 61 arranged on the first plier base 12 and a clamping base assembly 62 arranged on the second plier base 22. The blade base assembly 61 is provided for cutting operation, and it comprises a moveable blade base 611 and a fixed blade base 612. In addition, the clamping base assembly 62 is provided for clamping operation, and it comprises a moveable clamping base 621 and a fixed clamping base 622. Under effect of the cooperation between the blade base assembly 61 and the clamping base assembly 62 of the stripping plier 1, it is able to strip off an insulative outer layer of a cable successfully and smoothly.

Figure 5:
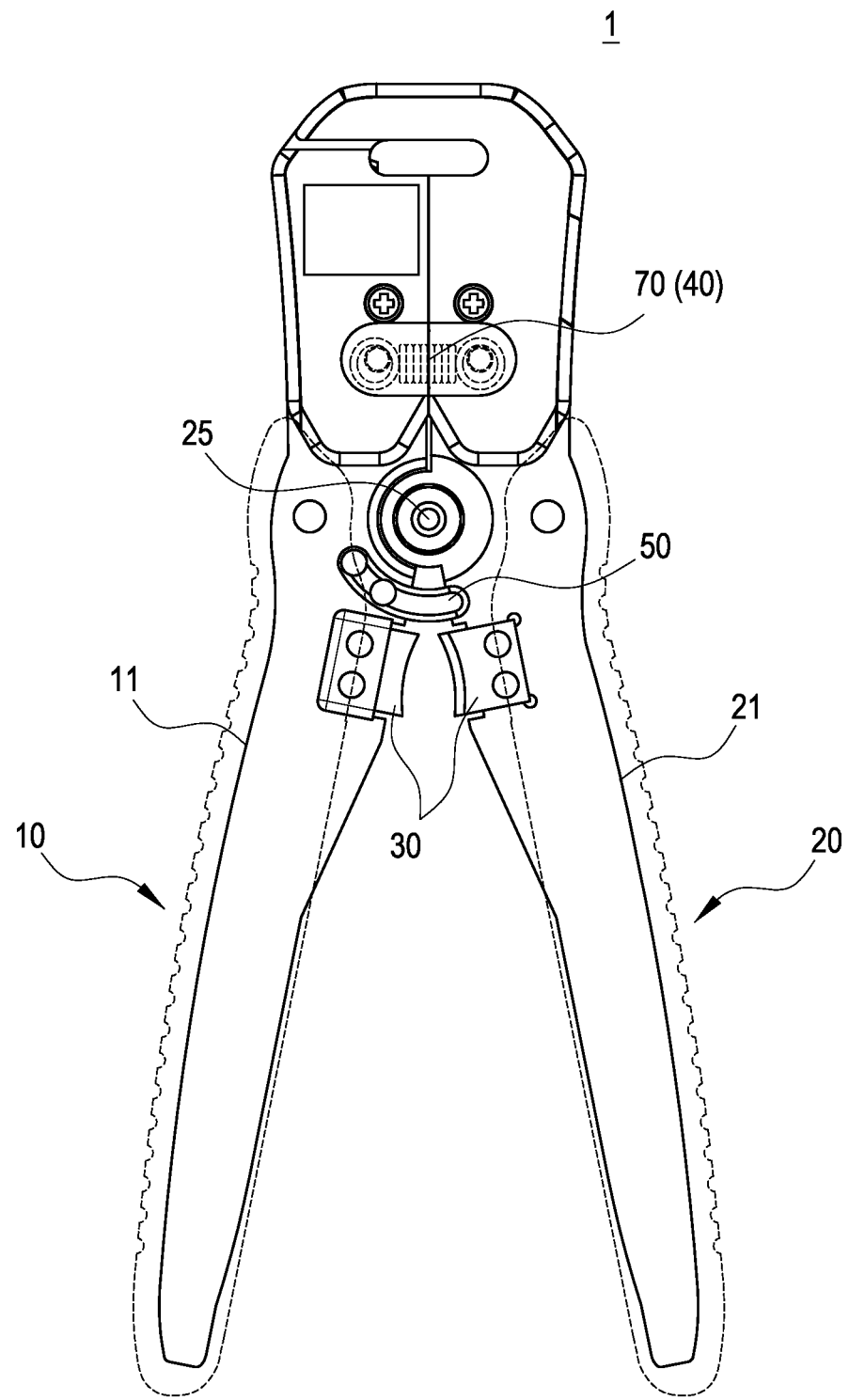
FIG. 5 is a first illustration showing a use of the stripping plier of the present invention.
Figure 6:
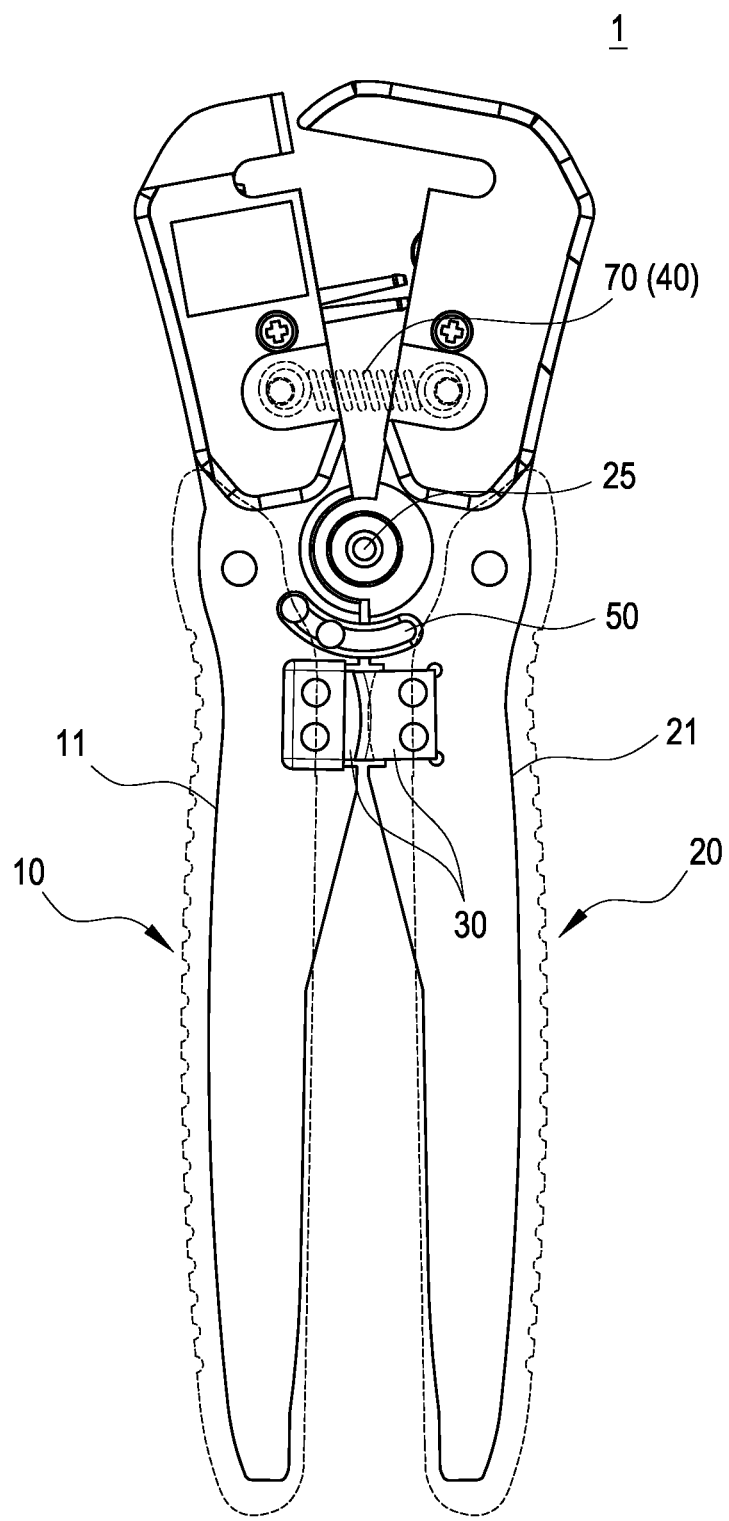
FIG. 6 is a second illustration showing a use of the stripping plier of the present invention.

Please refer to FIG. 5 and FIG. 6, showing two illustrations of the uses of the striping plier 1 with a supporting structure of the present invention. In one embodiment of the present invention, the stripping plier 1 further comprises a second spring 70. The second spring 70 and the first spring 40 are relatively disposed on different sides of the first plier handle 11 and the second plier handle 21. The arrangement of the second spring 70 is to assist the first spring 40 in order to provide a sufficient elastic recovery force for the stripping plier 1.

As shown in FIG. 5, when a user is not exerting a force onto the first plier member 10 and the second plier 20, the second spring 70 (first spring 40) is not subject to an external force for being under a compression state; therefore, at this time, an opened state exists between the first plier member 10 and the second plier member 20 in addition to that the blade assembly 30 is also of an opened state; therefore, a cable or wire (not shown in the figure) can be penetrated through the blade assembly 30 in order to further preform cutting of the cable.

As shown in FIG. 6, when the user exerts a force onto the first plier member 10 and the second plier 20, the second spring 70 (first spring 40) is subject to an external force in order to be under an tensioned state; therefore, at this time, a closed state exists between the first plier member 10 and the second plier 20 in addition to that the blade assembly 30 is able to perform cutting of the cable or wire penetrating through the blade assembly 30.

It shall be noted that a length of the supportive blocking member 50 extending to the second plier handle 21 when the blade assembly 30 is closed would be greater than a length thereof when the blade assembly 30 is opened; in other words, when the blade assembly 30 is closed, the supportive blocking member 50 is able to provide a greater supporting force to the second plier handle 21 in order to prevent any positional shifts of the first plier handle 11 and the second plier handle 21 due to the compression exerted by the external force thereon as well as to prevent any misplacements of the blade assembly 30, causing the stripping plier 1 to fail in cutting the cable properly.

In view of the above, it shall be noted that the above description provides preferred embodiments of the present invention only, which shall not be treated as limitation of the scope of the present invention. Any equivalent techniques and technical modifications based on the content of the specification and drawings of the present invention shall be deemed to be within the scope of the present invention.

What is claimed is:

1. A stripping plier with a supporting structure, comprising:
   a first plier member comprising a first plier handle and a first plier base attached to one side surface of the first plier handle;
   a second plier member comprising a second plier handle and a second plier base corresponding to the first plier base and attached to one side surface of the second plier handle, the second plier handle and the first plier handle pivotally attached to each other via a pivotal axle;
   a blade assembly attached to two opposite side edges of the first plier handle and the second plier handle correspondingly;
   a first spring having two ends secured onto the first plier handle and the second plier handle respectively, the first plier handle and the second plier handle using a recovery force of the first spring to open and close relatively to each other in order to allow the blade assembly to perform cutting; and
   an individual curve-shaped supportive blocking member entirely disposed between the blade assembly and the pivotal axle, one end of the curve-shaped supportive blocking member attached to the first plier handle and another end thereof extended to the second plier handle, the curve-shaped supportive blocking member configured to provide a supporting force to the first plier handle and the second plier handle while the blade assembly performs cutting, wherein the first plier handle and the second plier handle are sandwiched between the curve-shaped supportive blocking member and the first spring.

2. The stripping plier with a supporting structure according to claim 1, further comprising a first plier sleeve and a second plier sleeve, the first plier sleeve being mounted onto an external of the first plier handle, and the second plier sleeve being mounted onto an external of the second plier handle.

3. The stripping plier with a supporting structure according to claim 1, further comprising a wire stripping structure arranged on one end of first plier base and the second plier base.

4. The stripping plier with a supporting structure according to claim 3, wherein the wire stripping structure comprises a blade base assembly arranged on the first plier base and a clamping base assembly arranged on the second plier base; the blade base assembly comprises a moveable blade base and a fixed blade base; the clamping base assembly comprises a moveable clamping base and a fixed clamping base.

5. The stripping plier with a supporting structure according to claim 1, further comprising a plurality of riveting elements; the blade assembly using the plurality of riveting elements to be attached onto the first plier handle and the second plier handle.

6. The stripping plier with a supporting structure according to claim 1, further comprising a second spring, the second spring and the first spring being relatively disposed on different sides of the first plier handle and the second plier handle.

7. The stripping plier with a supporting structure according to claim 1, wherein the curve-shaped supportive blocking member is arranged between the pivotal axle and the blade assembly.

8. The stripping plier with a supporting structure according to claim 1, wherein the curve-shaped supportive blocking member is an arched structural member configured in such a way that a length of the curve-shaped supportive blocking member extending to the second plier handle when the blade assembly is closed is greater than a length thereof when the blade assembly is opened.

9. The stripping plier with a supporting structure according to claim 1, wherein half of the curve-shaped supportive blocking member directly abuts one side surface of the first plier handle.

* * * * *